United States Patent [19]

Spence, III et al.

[11] Patent Number: 5,669,711

[45] Date of Patent: Sep. 23, 1997

[54] VIBRATORY SETTLING OR COMPACTION UNIT

[75] Inventors: James F. Spence, III, Elgin; Paul Casey, Lindenhurst, both of Ill.

[73] Assignee: General Kinematics Corporation, Barrington, Ill.

[21] Appl. No.: 627,702

[22] Filed: Mar. 29, 1996

[51] Int. Cl.$^6$ ............... B01F 11/00; B65G 67/00
[52] U.S. Cl. ............... 366/108; 366/114; 366/128; 414/375
[58] Field of Search ............... 366/108, 110, 366/111, 114, 128; 414/373, 401, 375

[56] References Cited

U.S. PATENT DOCUMENTS

| | | | |
|---|---|---|---|
| 2,013,235 | 9/1935 | Collins | 366/108 |
| 2,431,872 | 12/1947 | Kavula | 366/114 |
| 2,489,869 | 11/1949 | Dunn | 414/401 |
| 2,648,447 | 8/1953 | Sheilds | 366/114 |
| 2,648,448 | 8/1953 | Shields | 366/114 |
| 2,706,566 | 4/1955 | Friedh et al. | 366/114 |
| 2,850,185 | 9/1958 | Erickson et al. | 366/128 |
| 3,047,169 | 7/1962 | Matson | 366/114 |
| 3,407,670 | 10/1968 | Venanzetti | 366/128 |
| 4,017,060 | 4/1977 | Brander et al. | 366/128 |
| 4,224,006 | 9/1980 | Dumbaugh et al. | 414/375 |
| 4,307,989 | 12/1981 | Dumbaugh | 414/375 |
| 4,600,046 | 7/1986 | Bailey et al. | 366/114 |

OTHER PUBLICATIONS

"High Performance Car Shakeout", Bulletin No. 384, General Kinematics Corp., Barrington, IL.

Primary Examiner—Tony G. Soohoo
Attorney, Agent, or Firm—Wood, Phillips, VanSanten, Clark & Mortimer

[57] ABSTRACT

Shipping costs incurred in the shipping of particulate material in bulk may be reduced through the use of a vibratory compaction unit that settles the bulk material within the container during the loading process enabling a greater quantity of the particulate material to be loaded into a container of a given volume. The vibratory compaction unit includes a clamping deck 40 having a generally vertical face 44 together with spaced contact blocks 96 located on the clamping deck 40 and extending from the face 44. Clamping hooks 94 are located on the clamping deck 40 for engaging lifting pockets 16, 18, of a universal shipping container 14 or the like to firmly clamp the container 14 against the contact blocks 16. An exciter mass 52 is spaced from but adjacent to the clamping deck 40 and a vibration imparting motors 64, 66, 68 are located on the exciter mass 52. Amplification springs 60 interconnect the clamping deck 40 and the exciter mass 52.

15 Claims, 5 Drawing Sheets

VIBRATORY SETTLING OR COMPACTION UNIT

FIELD OF THE INVENTION

This invention relates to a vibratory settling or compaction unit, and more specifically, to such a unit that is particularly suited for causing the contents of a shipping container such as a universal shipping container, a trailer or a rail car to settle or compact to allow a greater quantity of material to be shipped to be introduced into such a shipping container.

BACKGROUND OF THE INVENTION

Many types of particulate material are shipped in bulk, i.e., loose in a large shipping container. The shipping container may take on many different forms. For example, it could be a universal shipping container of the type that can be releasably mounted on a trailer chassis, a rail car, or stacked on a ship. The shipping container could also be simply a vehicular trailer or a rail car.

When such shipping containers are loaded, the nature of the loading process is typically such that the particulate material will "fluff up" as it is being loaded. When the container is filled, the loading operation is stopped and the container closed. Thereafter, the container will be shipped and as a result of the movement incurred in the shipping operation, the contents will settle substantially. When the shipping container arrives at its final destination, it is not unusual for as much as one-third of the volume of the shipping container to be empty. That is to say, the contents of the originally filled shipping container will have settled to occupy only two-thirds of the volume of the shipping container.

Quite obviously, substantial economies in the shipping of particulate material could be realized if the material could be caused to settle or be compacted during the loading process so that a greater quantity of the material could be introduced into the container at the outset.

One attempt to solve the problem involves the use of equipment such as that used to "shake out" rail cars to apply a vibratory force to universal shipping containers. Such equipment literally hammers the shipping container, giving rise to the potential for damage caused by repetitive impaction on the container. Because the container must be maintained in good condition to remain "universal" in their usage, this attempt was not an acceptable solution and was dropped.

The present invention is directed to meeting the need for equipment that will reliably, and without causing container damage, compact or settle material in a shipping container.

SUMMARY OF THE INVENTION

It is the principal object of the invention to provide a new and improved vibratory settling or compaction unit. More specifically, it is an object of the invention to provide such a unit so as to provide a means whereby the contents of shipping containers can be caused to settle or be compacted during the loading process to in turn enable the loading of a greater quantity of material in a shipping container of a given volume.

It is also an object of the invention to provide a loading dock embodying such a vibratory settling or compaction unit.

According to one facet of the invention, the foregoing object is achieved in a vibratory settling or compaction unit for compacting particulate material while in a shipping container as a truck, railway car or the like and which includes a clamping deck having a face adapted to substantially abut the container and clamping means on the clamping deck for engaging the container and firmly clamping the container against the clamping deck. An exciter mass is spaced from but adjacent to the clamping deck on the side thereof opposite the face and vibration imparting means are disposed on the exciter mass. Amplification springs interconnect the clamping deck and the exciter mass.

As a result of the foregoing, when the vibration imparting means are energized, vibration is imparted to the exciter mass and transmitted therefrom to the clamping deck by the amplification springs. Inasmuch as the shipping container is clamped to the clamping deck, it will be vibrated, causing particulate material therein to settle and be compacted.

In a preferred embodiment, contact blocks are included on the face for abutment with the container. The clamping blocks may be made of a hard polymeric material. Alternatively, they may be made of steel.

In one embodiment of the invention, the unit further includes a base and resilient isolation means mount the clamping deck and the exciter means on the base.

In another facet, the invention contemplates the provision of a vibratory compaction unit for compacting particulate material while in a universal shipping container of the type having spaced lifting pockets at predetermined positions thereon and which is adapted to be transported on a trailer, a railway car or the like. The vibratory unit includes a clamping deck having a generally vertical face. Spaced contact blocks are disposed on the clamping deck and extend from the face. The distance between the contact blocks is substantially equal to the spacing between the lifting pockets on the container.

Clamping means are disposed on the clamping deck for engaging the lifting pockets on the container to firmly clamp the container against the contact blocks. An exciter mass is spaced from but adjacent to the clamping deck on the side thereof opposite the vertical face and vibration imparting means are disposed on the exciter mass. Amplification springs interconnect the clamping deck and the exciter mass. A base is provided and resilient isolation means mount the clamping deck and the exciter mass on the base.

In a preferred embodiment, the clamping means include hooks receivable in the lifting pockets along with means for moving the hooks toward the clamping deck.

According to still another facet of the invention, there is provided a loading dock that includes the vibratory settling or compaction unit. The loading dock includes a trailer receiving surface and an elevated loading surface at one end of the trailer receiving surface. The vibratory compaction unit is located at the one end of the trailer receiving surface under the loading surface and well above the trailer receiving surface and has its base secured to the latter. The vibratory compaction unit has its face generally vertically disposed and facing the trailer receiving surface.

In a preferred embodiment, the loading dock includes spaced, generally parallel guide rails along the trailer receiving surface for engaging and guiding the wheels of a trailer toward the one end of such surface whereat the loading surface is located.

Other objects and advantages will become apparent from the following specification taken in connection with the accompanying drawings.

DESCRIPTION OF THE PREFERRED EMBODIMENT

Figure 1:
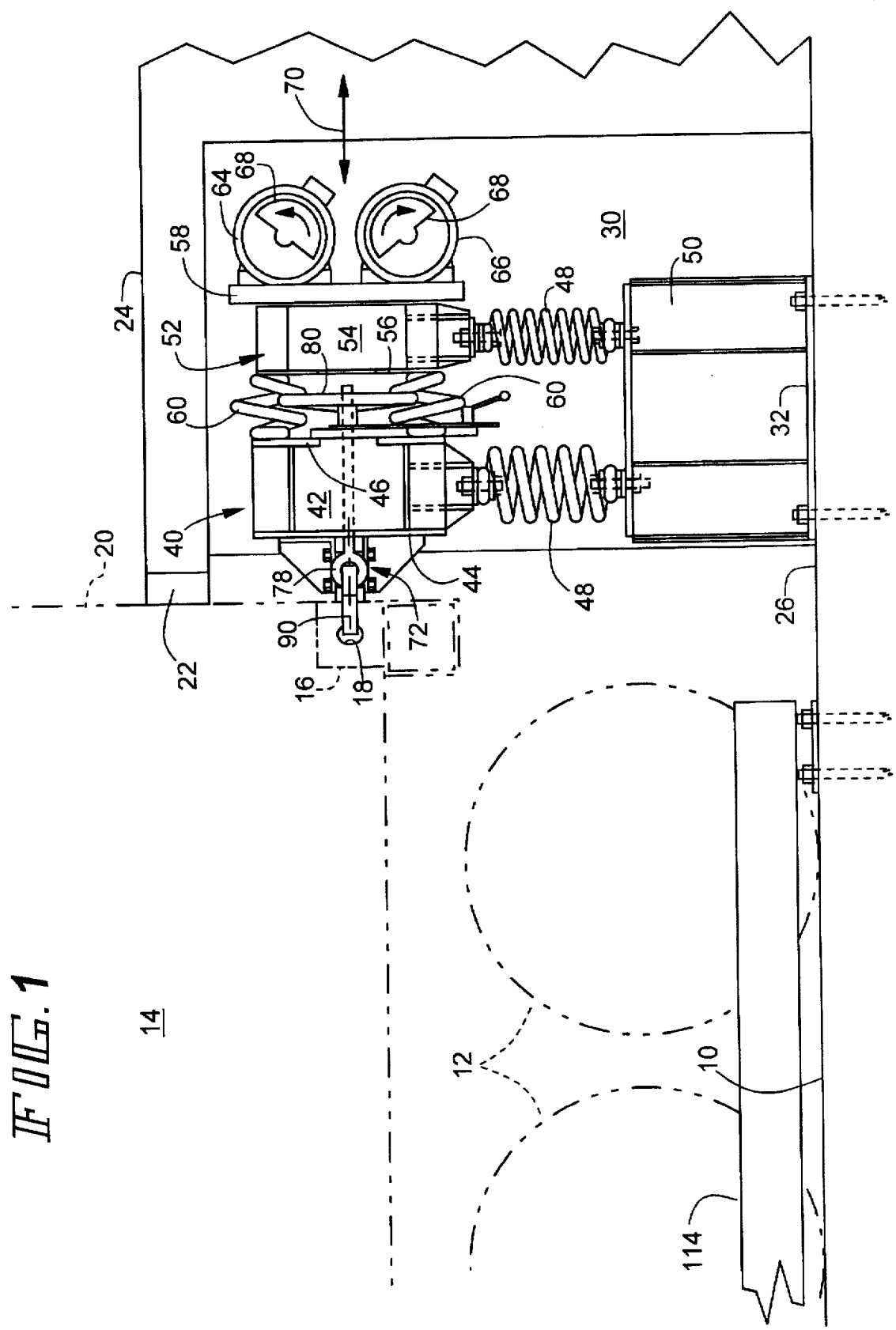
FIG. 1 is a fragmentary, side elevation of a loading dock including a vibratory settling or compaction unit made according to the invention.

The vibratory settling and compaction unit of the invention is illustrated in the drawings and will be described hereinafter in connection with a loading dock; and this constitutes the best mode of the invention presently contemplated by the applicants. However, it is to be understood that in some instances, the unit will find utility in environments other than loading docks and no limitation to loading docks is intended except insofar as stated in the appended claims.

With reference to FIG. 1, a flat, horizontal surface 10 acts as a trailer receiving surface for receiving a trailer whose rear wheels are shown at 12. The trailer includes a chassis (not shown) and releasably mounted to the chassis is a universal shipping container 14 of conventional construction. As is well known, the shipping container 14 will be in the form of a rectangular solid and will have lifting pockets 16 at each of its eight corners. The lifting pockets provide a means whereby lifting apparatus may be utilized to lift the container 14 from one conveyance and place it on another as, for example, in lifting the container 14 from a trailer chassis to a railway car or from a railway car to a ship. The lifting pockets 16 also include openings 18 for receipt of latches whereby the container 14 may be latched to a trailer chassis, rail car or even to another universal shipping container 14.

As illustrated in FIG. 1, the rear end 20 of the container 14 is in proximity to the edge bumper 22 of a loading surface or dock 24. The loading surface 24 is elevated above the trailer receiving surface 10 and adjacent an end 26 of the latter. Equipment for loading the container 14 will typically be located at or above the loading surface 24 or, in some instances, the container 14 may be loaded directly from the surface 24.

As seen in FIG. 1, a rectangular pocket 30 is located below the loading surface 24 and opens toward the end 26 of the trailer receiving surface 10. A vibratory settling and compaction unit made according to the invention is located in the pocket 30 and is seen to include spaced base plates 32 which may be mounted to an extension of the surface 10 to one side of the end 26.

Above the base, the vibratory compaction unit includes a horizontally elongated clamping deck, generally designated 40. The clamping deck 40 includes a rectangular, central frame 42 closed by two metallic plates 44 and 46. The plate 44 defines a vertical face that faces the trailer receiving surface 10 and the universal container 14. A series of isolation springs 48 extend between pedestals 50 on the base plates 32 and the frame 42 of the clamping deck 10 so as to mount the latter above the base plates 32.

Figure 2:
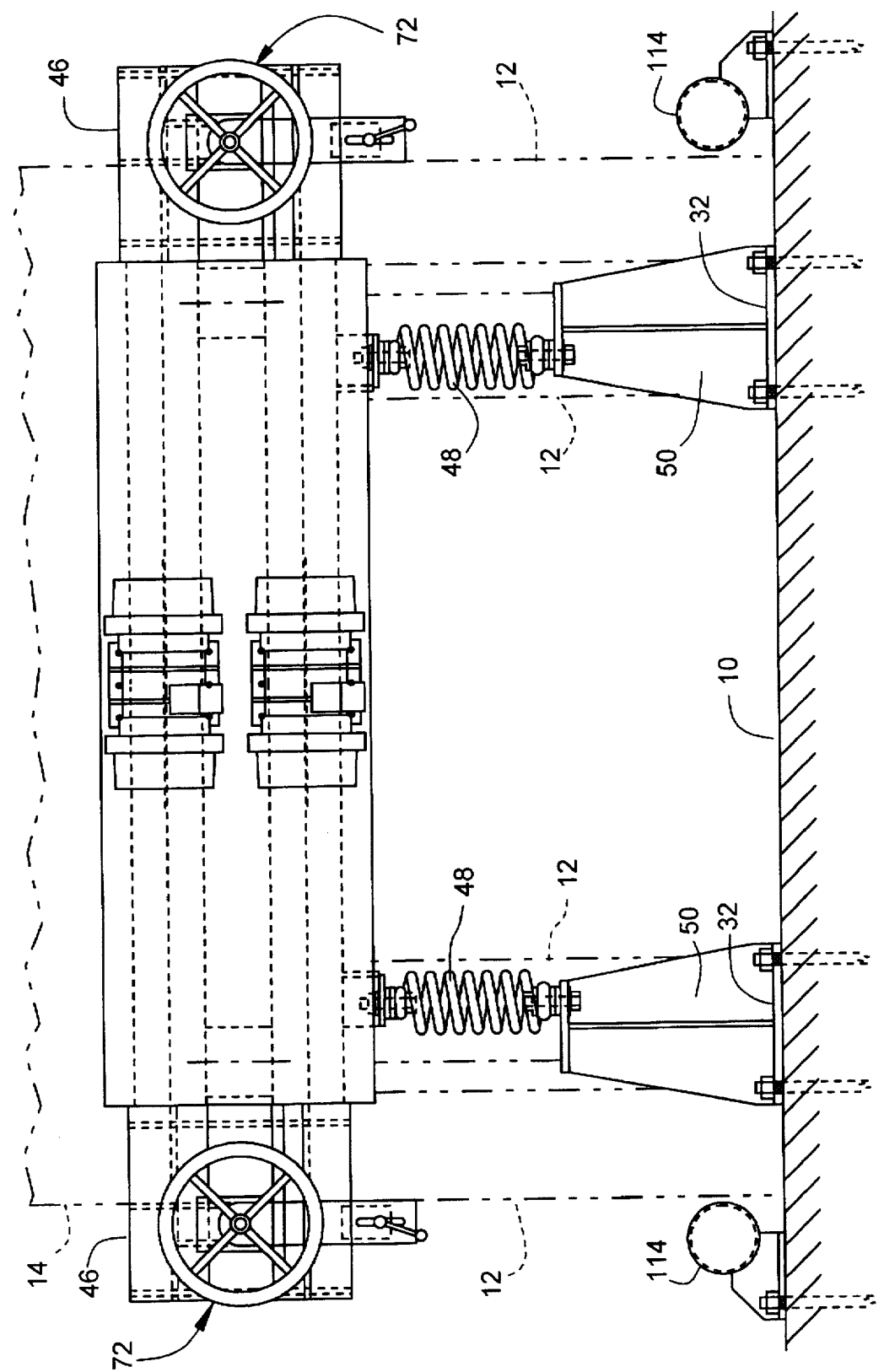
FIG. 2 is a rear elevation taken approximately 90° from the view of FIG. 1.

On the side of the clamping deck 40 opposite from the face defined by the plate 44, an exciter mass is located and is generally designated 52. The same also is horizontally elongated, although somewhat shorter than the clamping deck 40 as can be seen in FIG. 2. The exciter mass 52 also includes a rectangular frame 54 which is sandwiched between plates 56 and 58. The plate 56 faces the plate 46 and a series of amplification springs 60 interconnect the exciter mass 52 and the clamping deck 40. Additional isolation springs 48 also support the exciter mass 52 above the base 32.

As seen in FIG. 2, the plate 58 mounts first and second vertically spaced motors 64 and 66. The motors 64, 66 are electric motors and rotate in opposite directions. As shown somewhat schematically in FIG. 1, each of the motors drives an eccentric weight 68 and because the motors 64 and 66 are vertical spaced, and because they are counter rotating, vibratory forces generated by the eccentric weights 68 in all directions but the horizontal will cancel out when the motors 64 and 66 rotate synchronously, something that occurs naturally in operation of the system. That is to say, when the motors 64 and 66 are in operation, vibratory force in the direction of an arrow 70 (FIG. 1) will be generated and will be purely in the horizontal direction.

This vibratory force is, of course, imparted to the exciter mass 52 by reason of the motors 64 and 66 being mounted thereon. As the exciter mass 52 vibrates the amplification springs 60 will react thereto and transmit the vibration to the clamping deck 40 which will likewise vibrate in the horizontal direction. This horizontal vibration of the clamping deck 40 is imparted to the container 14 by means to be seen for the purpose of causing the contents therein to settle and be compacted during the loading process.

According to the invention, two spaced clamps, each generally designated 72, are located on opposite ends of the clamping deck 44. As each clamp 72 is identical to the other, only one will be described.

Figure 4:
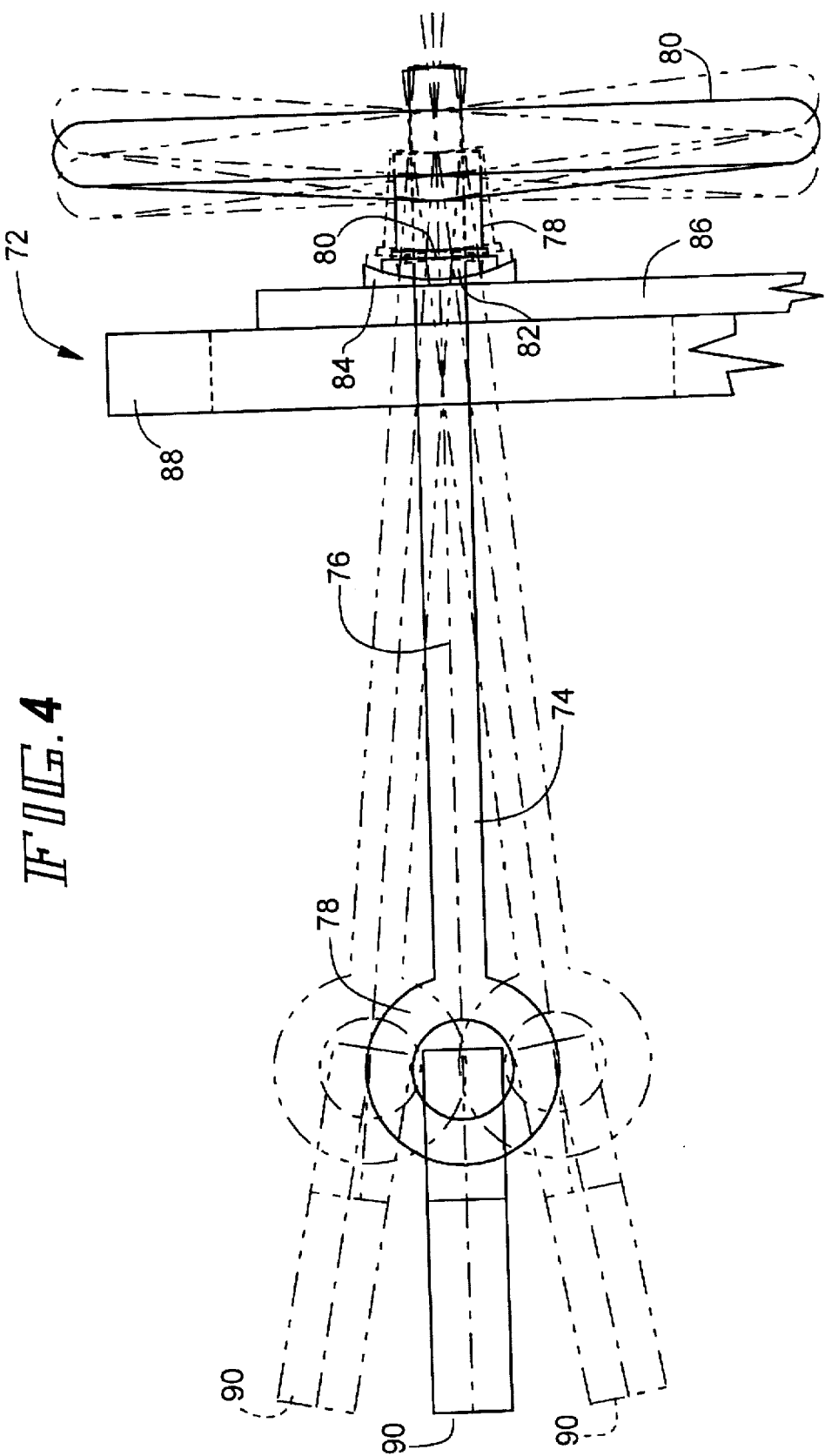
FIG. 4 is an enlarged, fragmentary, elevational view of a clamping mechanism used in the invention.

As best seen in FIG. 4, each clamp 72 includes an eye bolt 74 having a threaded shaft 76 and an eye 78. The threaded shaft 76 is received in a nut 78 which is attached to a rotatable hand wheel 80. The nut 78 bears against a hardened steel washer 80 which in turn bears against a convex spherical washer 82 received in the concave face of a concave spherical washer 84. The latter bears against an adjusting plate 86, to be described in greater detail hereinafter, which in turn bears against a plate 88 which is backed by the plate 46 of the clamping deck.

Figure 3:
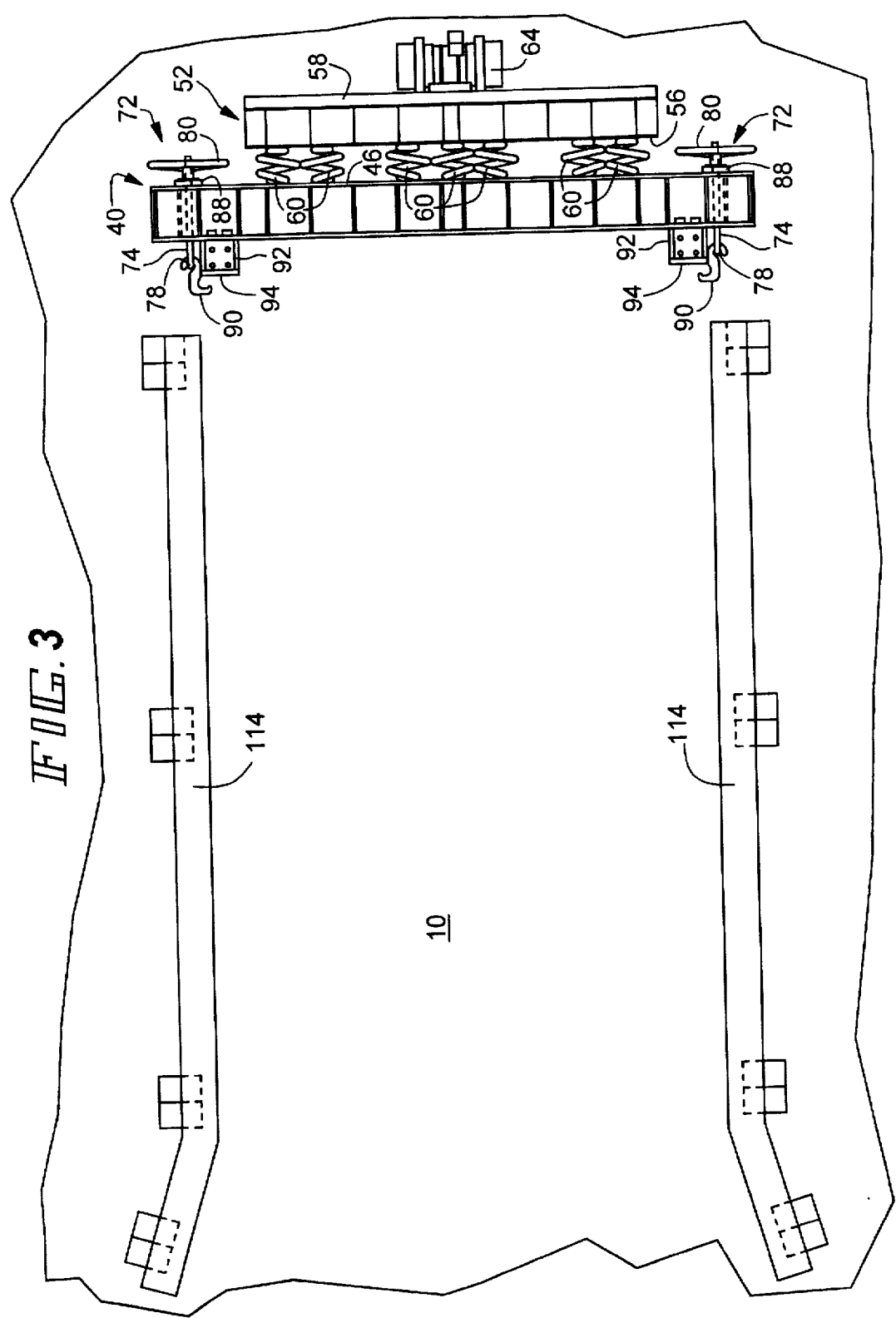
FIG. 3 is a plan view of the vibratory settling and compaction unit.

As seen in FIG. 3, an S-shaped hook 90 is received in each of the eyes 78. As can be appreciated from FIGS. 1 and 3, the ends of the hooks 90 remote from the eyes 78 may be received in the openings 18 in the lifting pockets 16 on the universal container 14. By rotating the hand wheel 80 in the appropriate direction, the shaft 76 may be advanced toward the container 14 to loosen the clamping force or retracted from the container to tightly clamp the same to the clamping deck 44.

Preferably, the plate 44, as best seen in FIG. 3, mounts a pair of standoffs 92 which have contact blocks 94 for contacting the container 14. The contact blocks 94 may be of any suitable material. For example, they may be made of steel or, in the alternative, so-called UHMW material, an ultra high molecular weight polymer. The contact blocks 94 are spaced a distance substantially equal to the spacing between the lifting pockets 16 on a universal container 14.

Returning to FIG. 4, it can be seen that each hook 90 is capable of vertical adjustment to the dotted line positions illustrated by reason of the presence of the spherical bearings 82 and 84. In some cases, it is desirable that an even greater range of vertical movement be permitted and to this end, a preferred embodiment of the invention provides a means whereby the vertical location of the hand wheels 80 can also be adjusted.

Figure 5:
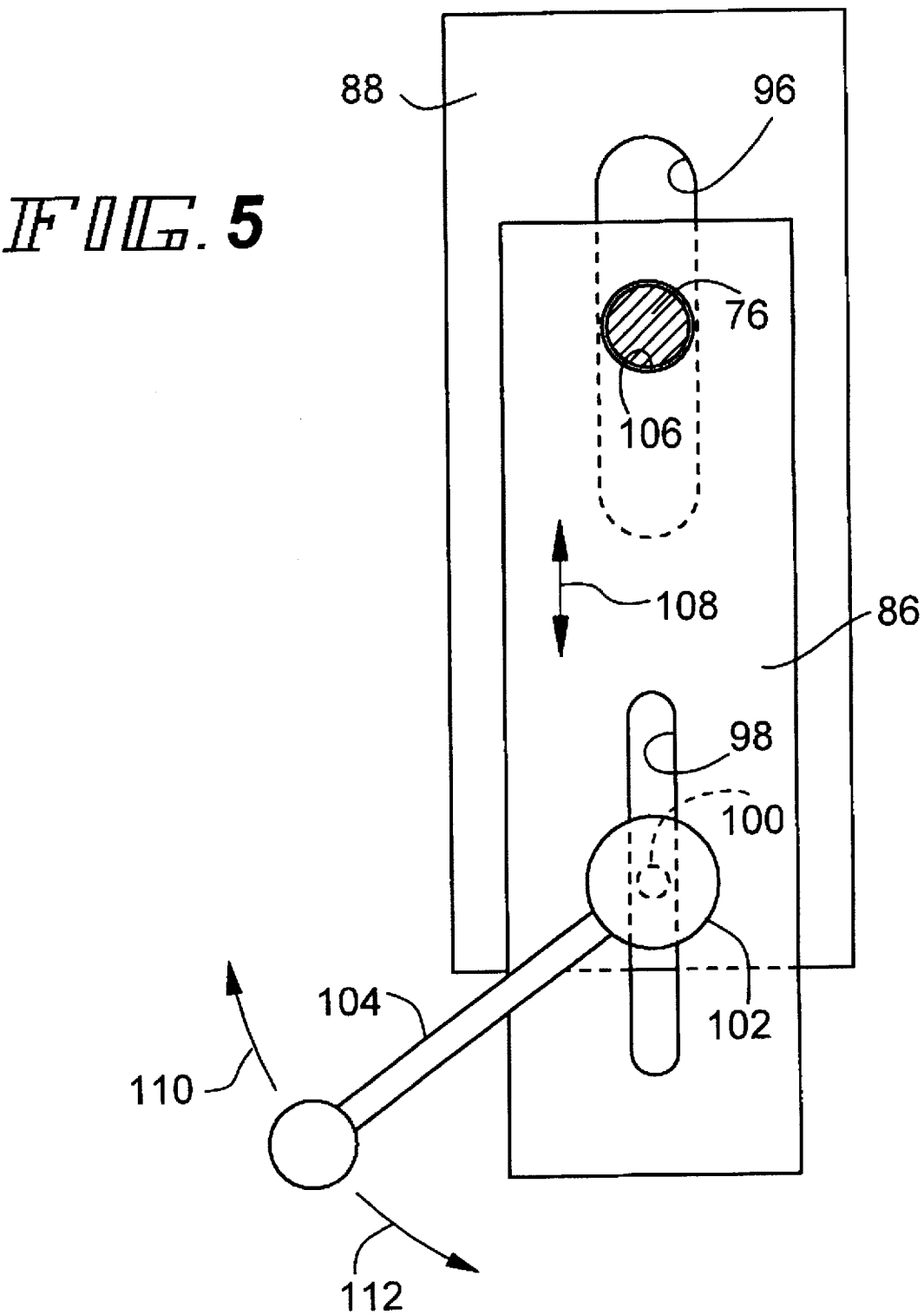
FIG. 5 is an elevation, with parts shown in section, of part of the clamping mechanism.

Referring to FIGS. 4 and 5, the plate 88 is mounted to the plate 46 of the clamping deck 40 (see FIG. 3) and includes a vertically elongated slot 96 through which the shaft 76 of the eye bolt 74 extends. The plate 86 which abuts the plate 88, is provided with a vertically elongated slot 98 of the same length as the slot 96. A threaded stud 100 affixed to the plate 88 extends through the slot 98 to receive a clamping nut 102. A handle 104 is secured to the clamping nut 102.

Remote from the slot 98, the plate 86 includes a circular opening 106 of slightly larger diameter than that of the shaft 76 and through which the shaft 76 extends.

As a consequence of the foregoing, the plate 86 is mounted for vertical adjustment in the direction of an arrow 108 on the plate 88. Because the opening 106 receives the shaft 76 of the eye bolt 74, when the plate 86 is moved vertically, it takes the eye bolt with it to provide for vertical adjustment of the same. The plate 86 may be held against the plate 88 and any position of adjustment simply by rotating the handle 104 in the direction of an arrow 110 to tighten the clamping nut 102 against the plate 86. To loosen the clamping nut 102, the handle may be moved in a direction shown by an arrow 112.

As a consequence of the foregoing construction, the vertical position of the eye bolt 74 can be changed by tilting the same through use of the spherical bearings 82 and 84 or by elevating or lowering the plate 86 on the plate 88 or both.

To assist in aligning a container 14 with the clamping deck 40, just above the trailer receiving surface 10, elongated guide rails 114 (FIGS. 1, 2 and 3) are provided. The guide rails 114 are spaced so as to be engageable with the side walls of the tires 12 and cause the trailer to be moved to a position whereat the lifting pockets 16 of the container 14 engage the contact blocks 94 to allow the hooks 90 to be inserted in the openings 18 of the lifting pockets 16.

In use, the trailer is moved into the desired position and latched to the clamping deck 40 by engaging the hooks 90 in the openings 18 in the lifting pockets and appropriately operating the hand wheels 80. This will firmly clamp the container 14 to the clamping deck 40.

The equipment employed to fill the container 14 may then be put in operation and the filling procedure initiated.

After several minutes or longer, depending upon the rate at which the container 14 is being filled, when the same is perhaps ¼ or ⅓ filled, the motors 64 and 66 may be energized to cause the vibratory settling and compaction unit to begin operation. Vibration will be imparted to the container 14 as the filling operation continues, with the result that the contents of the container 14 will be settled almost as soon as they are introduced thereinto. The operation continues until the container 14 is filled, at which time the container may be sealed, the motors 64 and 66 deenergized, and the hooks 90 released. At this point, the vast majority of the settling of the material that would occur in shipping under normal circumstances will have already occurred allowing for a substantial increase in the quantity of material that can be shipped in a single one of the containers 14. As a consequence, users of the system realize substantial savings in shipping costs.

It is to be particularly noted that the vibration imparted to the container 14 is at right angles to the rotational axes of the wheels 12. Consequently, the vibration acts on the trailer axles or wheel spindles in the same direction as the normal rolling motion of the trailer when in transit. Thus, no motion that would stress the wheel bearings more than that incurred in normal usage is imparted thereto. Furthermore, the use of the clamps 72 and contact blocks 94 avoids hammering of the container so that damage is eliminated. And importantly, this feature of the invention enhances settling action. If a hammering action was used, only one stroke per revolution of the motors 64, 66 would be applied to the container 14, namely the stroke applied as the clamping deck or hammer moves toward the container. But with the use of the clamps 72, two strokes are applied for each revolution of the motors 64 and 66, namely, the same stroke mentioned above and, in addition, the return stroke as the clamping deck 40 moves away from the trailer receiving surface 10. As a consequence, compacting action is intensified and settling occurs more rapidly.

We claim:

1. A vibratory compaction unit for compacting particulate material while in a universal shipping container of the type having spaced lifting pockets at predetermine depositions thereon and adapted to be transported on a trailer, railway car or other vehicle, said unit comprising:

a clamping deck having a generally vertical face;

spaced contact blocks on said deck and extending from said face, the distance between said contact blocks being substantially equal to the spacing between said lifting pockets;

clamping means on said clamping deck for engaging lifting pockets on said container to firmly clamp the container against said contact blocks;

an exciter mass spaced from but adjacent to said clamping deck on the side thereof opposite said vertical face;

vibration imparting means on said exciter mass;

springs interconnecting said clamping deck and said exciter mass;

a base; and resilient isolation means mounting said clamping deck and said exciter mass on said base.

2. The vibratory compaction unit of claim 1 wherein said clamping means include hooks receivable in said lifting pockets, and means for moving said hooks toward said clamping deck.

3. The vibratory compaction unit of claim 2 wherein said moving means are manually operable.

4. The vibratory compaction unit of claim 3 wherein said moving means include a hand wheel.

5. The vibratory compaction unit of claim 1 further including means mounting said clamping means on said clamping deck for vertical adjustment thereon.

6. A vibratory compaction unit for compacting particulate material while in a shipping container, said unit comprising:

a clamping deck having a face adapted to substantially abut the container;

clamping means on said clamping deck for engaging the container and firmly clamp the container against said clamping deck;

an exciter mass spaced from but adjacent to said clamping deck on the side thereof opposite said face;

vibration imparting means on said exciter mass; and springs interconnecting said clamping deck and said exciter mass.

7. The vibratory compaction unit of claim 6 further including contact blocks on said face for abutment against said container.

8. The vibratory compaction unit of claim 6 further including means adjustably mounting said clamping means on said clamping deck.

9. The vibratory compaction unit of claim 6 further including a base, and resilient isolation means mounting said clamping deck and said exciter means on said base.

10. A loading dock including the vibratory compaction unit of claim 9 and further having a trailer receiving surface; and an elevated loading surface at one end of said trailer receiving surface;

said vibratory compaction unit being located at said one end just under said loading surface and well above said receiving surface and said base secured thereto, with said face being generally vertically disposed and facing away from said loading surface.

11. The loading dock of claim 10 further including spaced, parallel guide rails along said receiving surface for engaging and guiding the wheels of a trailer toward said one end.

12. The vibratory compaction unit of claim 6 wherein said clamping means comprise a pair of spaced clamps mounted on opposite ends of said clamping deck.

13. The vibratory compaction unit of claim 12 wherein said clamping means are manually operable.

14. The vibratory compaction unit of claim 13 where each of said clamping units comprises a threaded shaft, a hand wheel threaded on said shaft, and a hook connected to said shaft remote from said hand wheel and adapted to be received in the lifting pocket of a shipping container.

15. The vibratory compaction unit of claim 14 further including means mounting each said clamp for vertical adjustment on said clamping deck.

* * * * *